United States Patent
Matias et al.

(10) Patent No.: US 11,146,681 B2
(45) Date of Patent: *Oct. 12, 2021

(54) SYSTEMS AND METHODS FOR SCHEDULING DEFERRED QUEUES

(71) Applicant: Talkdesk, Inc., San Francisco, CA (US)

(72) Inventors: João Matias, Lisbon (PT); Gennadiy Stepanov, Hallandale Beach, FL (US); Filipe Valeriano, Coimbra (PT); João Tremoço, Coimbra (PT)

(73) Assignee: Talkdesk, Inc., San Francisco, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/744,391

(22) Filed: Jan. 16, 2020

(65) Prior Publication Data

US 2021/0218839 A1    Jul. 15, 2021

Related U.S. Application Data

(63) Continuation of application No. 16/738,576, filed on Jan. 9, 2020.

(51) Int. Cl.
*H04M 3/42* (2006.01)
*H04M 3/51* (2006.01)
(Continued)

(52) U.S. Cl.
CPC .... *H04M 3/5175* (2013.01); *G06Q 10/06315* (2013.01); *G06Q 10/063116* (2013.01);
(Continued)

(58) Field of Classification Search
CPC ............ H04M 3/5175; H04M 3/5191; H04M 2203/402
(Continued)

(56) References Cited

U.S. PATENT DOCUMENTS

| | | | |
|---|---|---|---|
| 6,754,333 B1 * | 6/2004 | Flockhart ............ | H04M 3/5191 379/266.01 |
| 9,137,366 B2 * | 9/2015 | Medina ............... | H04M 3/5175 |

(Continued)

*Primary Examiner* — William J Deane, Jr.
(74) *Attorney, Agent, or Firm* — Rimon PC; Marc Kaufman

(57) ABSTRACT

A system for scheduling deferred communications is provided. A workload requirement for a deferred queue for each interval of a set of intervals is determined. Each workload may indicate the amount of work predicted for the associated interval. A staffing requirement for an immediate queue is received and may indicate the number of agents needed to handle the immediate communications for the same intervals. The system, for each interval, may consider the number of agents needed for the interval in the immediate queue. Because the deferred communications do not have to be handled at any particular interval, the system may, based on the workloads, schedule agents for the deferred queue where the immediate queue is less busy (a smaller number of agents are scheduled). The goal of the system being to smooth the intervals such that the total number of agents scheduled for each interval across the immediate queue and the deferred queue remains fairly constant.

26 Claims, 10 Drawing Sheets

(51) Int. Cl.
*H04M 3/523* (2006.01)
*G06Q 10/10* (2012.01)
*G06Q 10/06* (2012.01)

(52) U.S. Cl.
CPC ... *G06Q 10/063118* (2013.01); *G06Q 10/107* (2013.01); *H04M 3/42382* (2013.01); *H04M 3/5191* (2013.01); *H04M 3/5232* (2013.01); *H04M 3/5234* (2013.01); *H04M 3/5237* (2013.01); *H04M 3/5238* (2013.01); *H04M 2203/402* (2013.01)

(58) Field of Classification Search
USPC ....... 379/265.01–265.14, 266.01–266.1, 309
See application file for complete search history.

(56) References Cited

U.S. PATENT DOCUMENTS

| | | | | |
|---|---|---|---|---|
| 9,609,131 | B2* | 3/2017 | Placiakis | H04M 3/5175 |
| 9,883,037 | B1* | 1/2018 | Lewis | H04M 3/5175 |
| RE46,852 | E* | 5/2018 | Petrovykh | H04L 43/0817 |
| 2007/0061183 | A1* | 3/2007 | Seetharaman | G06Q 10/06311 |
| | | | | 705/7.13 |
| 2012/0321073 | A1* | 12/2012 | Flockhart | H04M 3/5191 |
| | | | | 379/266.06 |
| 2013/0136252 | A1* | 5/2013 | Kosiba | G06Q 10/105 |
| | | | | 379/265.05 |
| 2016/0150086 | A1* | 5/2016 | Pickford | H04M 3/5158 |
| | | | | 379/265.09 |
| 2016/0155080 | A1* | 6/2016 | Gnanasambandam | ...................... |
| | | | | H04M 3/5175 |
| | | | | 379/265.03 |
| 2016/0173692 | A1* | 6/2016 | Wicaksono | G06Q 10/067 |
| | | | | 379/265.03 |
| 2018/0198917 | A1* | 7/2018 | Ristock | G06Q 10/063112 |

* cited by examiner

100

SYSTEMS AND METHODS FOR SCHEDULING DEFERRED QUEUES

CROSS-REFERENCE TO RELATED APPLICATIONS

This application is a continuation of U.S. patent application Ser. No. 16/738,576 filed on Jan. 9, 2020, entitled "SYSTEMS AND METHODS FOR SCHEDULING DEFERRED QUEUES." The contents of which are hereby incorporated by reference.

BACKGROUND

Modern contact centers can have many types of communications—calls, emails, chats, social media, etc. Some of these—like calls—must be handled in (near) real-time; these are immediate communications. Others—like emails—need not be handled right away and may be put off for anywhere from an hour to several days; these are deferred communications. Scheduling for a contact center that has only immediate communications is relatively straight-forward: wherever calls are coming in, that's where agents should be scheduled. When a contact center has deferred communications, though, it's much more difficult to determine the required staffing at any given point, because they can be handled any time within the next several hours or days from when they come in.

SUMMARY

A system for scheduling deferred communications is provided. A workload requirement for a deferred queue for each interval of a set of intervals is determined. Each workload may indicate the amount of work predicted for the associated interval. A staffing requirement for an immediate queue is received and may indicate the number of agents needed to handle the immediate communications for the same intervals. The system, for each interval, may consider the number of agents needed for the interval in the immediate queue. Because the deferred communications do not have to be handled at any particular interval, the system may, based on the workloads, schedule agents for the deferred queue where the immediate queue is less busy (a smaller number of agents are scheduled). The goal of the system being to smooth the intervals such that the total number of agents scheduled for each interval across the immediate queue and the deferred queue remains fairly constant.

In an embodiment, a method is provided. The method includes: receiving a first set of staffing requirements for a first queue by a computing device, wherein the first set of staffing requirements includes a staffing requirement for each interval of a plurality of intervals, and the intervals of the plurality of intervals are ordered; receiving a workload for each interval of the plurality of intervals for a second queue by the computing device; generating a second set of staffing requirements for the second queue by the computing device based on the received workload for each interval; and for one or more intervals of the plurality of intervals, distributing, by the computing device, at least a portion of the staffing requirement of the second set of staffing requirements associated with the interval to a staffing requirement of the second set of staffing requirements of a subsequent interval of the plurality of intervals based on a sum of the staffing requirement for the interval of the first set of staffing requirements and the staffing requirement for the interval of the second set of staffing requirements.

In an embodiment, a method is provided. The method includes: receiving a first set of staffing requirements for a first queue by a computing device, wherein the first set of staffing requirements includes a staffing requirement for each interval of a plurality of intervals, and the intervals of the plurality of intervals are ordered; receiving a workload for each interval of the plurality of intervals for a second queue by the computing device; generating a second set of staffing requirements for the second queue by the computing device based on the received workload for each interval; determining an optimal level based on the first set of staffing requirements and the second set of staffing requirements by the computing device; and for each interval of the plurality of intervals, when the sum of the staffing requirement of the first set of staffing requirements for the interval and the staffing requirement of the second set of staffing requirements for the interval is above the optimal level, distributing at least a portion of the staffing requirement of the second set of staffing requirements associated with the interval to a staffing requirement of the second set of staffing requirements of a subsequent interval.

In an embodiment, a method is provided. The method includes: receiving a first set of staffing requirements for a first queue by a computing device, wherein the first set of staffing requirements includes a staffing requirement for each interval of a plurality of intervals, and the intervals of the plurality of intervals are ordered; receiving a workload for each interval of the plurality of intervals for a second queue by the computing device; generating a first combined set of staffing requirements by, for each interval of the plurality of intervals, generating a combined staffing requirement using the staffing requirement for the interval and the workload for the interval; and for each interval of the plurality of intervals, when the combined staffing requirement is above an optimal level, distributing at least a portion of the combined staffing requirement attributable to a workload to the combined staffing requirement of a subsequent interval of the first combined set of staffing requirements.

In an embodiment, a method is provided. The method includes: receiving a first combined set of staffing requirements for a first queue and a second queue by a computing device, wherein the first combined set of staffing requirements includes a staffing requirement for each interval of a plurality of intervals, and the intervals of the plurality of intervals are ordered; receiving a workload for each interval of the plurality of intervals for a third queue by the computing device; generating a second combined set of staffing requirements by, for each interval of the plurality of intervals, generating a combined staffing requirement by adding the staffing requirement from the interval to the workload for the interval; and for each interval of the plurality of intervals, when the combined staffing requirement is above an optimal level, distributing at least a portion of the combined staffing requirement attributable to the workload from the interval to the combined staffing requirement of a subsequent interval.

In an embodiment, a method is provided. The method includes: receiving an indication of a first queue by a computing device; receiving a first goal time for the first queue by the computing device; and determining, by the computing device, whether the first queue is an immediate queue or a deferred queue based on the first goal time by the computing device.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Figure 1:
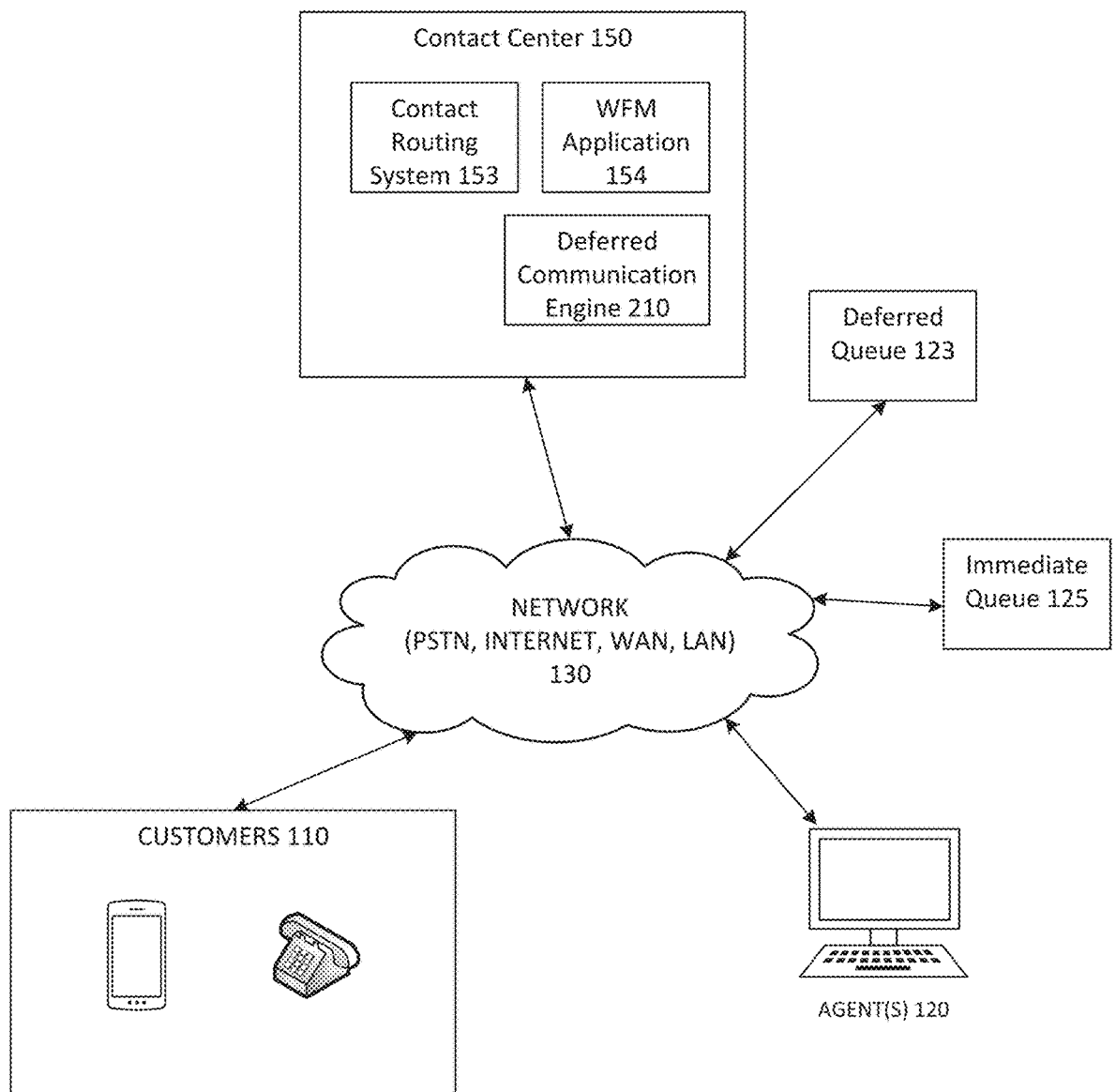
FIG. 1 is an illustration of an example system architecture.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with the agents 120 through a network 130 and one or more of text or multimedia channels. The system that controls the operation of the contact center 150 including the routing and handling of communications between customers 110 and agents 120 for the contact center 150 is referred to herein as the contact routing system 153. Depending on the embodiment, the contact routing system 153 could be any of a contact center as a service (CCaaS) system, an automated call distributor (ACD) system, or a case system, for example.

The agents 120 may be remote from the contact center 150 and may handle communications with customers 110 on behalf of an enterprise. The agents 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

In some embodiments, the agents 120 may be assigned to one or more queues. The agents 120 assigned to a queue may handle communications that are placed in the queue by the contact center 150. For example, there may be queues associated with a language (e.g., English or Chinese), topic (e.g., technical support or billing), or a particular country of origin. When a communication is received by the contact center 150, the communication may be placed in a relevant queue, and one of the agents 120 associated with the relevant queue may handle the communication.

The communications received by the contact center 150 may be categorized as either immediate communications or deferred communications. An immediate communication is a type of communication that must be handled quickly. Examples include calls or chat sessions. A deferred communication is a type of communication that can be handled at a later time after it is received. Examples include email, twitter, and SMS.

When an immediate communication is received by the contact center 150 it is placed in an immediate queue 125 where it may be handled by a next available agent 120 that is assigned to the immediate queue 125. Alternatively or additionally, the immediate communication may be immediately handled by an agent 120 without being placed in the immediate queue 125. When a deferred communication is received by the contact center 150 it is placed in a deferred queue 123 where it may be handled by an agent 120 assigned to the deferred queue 123 at a later time.

The contact center 150 may further include a workforce management ("WFM") application 154. The WFM application 154 may generate forecasts and schedules for the contact center 150 and the agents 120 and may ensure that the contact center 150 complies with all laws and regulations regarding agent 120 work hours. While efficiently scheduling agents 120 to work on immediate queues 125 is straightforward because the immediate communications cannot be deferred, efficiently scheduling agents 120 to work on deferred queues 123 is more difficult because the deferred communications can be handled within a range of acceptable times.

Accordingly, to solve these problems and others, the contact center 150 may further include a deferred communication engine 210. The deferred communication engine 210 is configured to schedule agents 120 to the deferred queue 123 in a way that considers the forecasted staffing needs of the immediate queue 125. In particular, the deferred communication engine 210 schedules agents 120 to the deferred queue 123 during intervals where the immediate queue 125 is forecasted to be less busy. This allows the total number of agents 120 assigned to either a deferred queue 123 or an immediate queue 125 for any interval to be relatively constant.

Note that while the deferred communication engine 210 is described herein with respect to a contact center 150 and one or more agents 120, it is for illustrative purposes only. The deferred communication engine 210 can be used by any entity that schedules employees to both deferred and immediate tasks.

Figure 2:
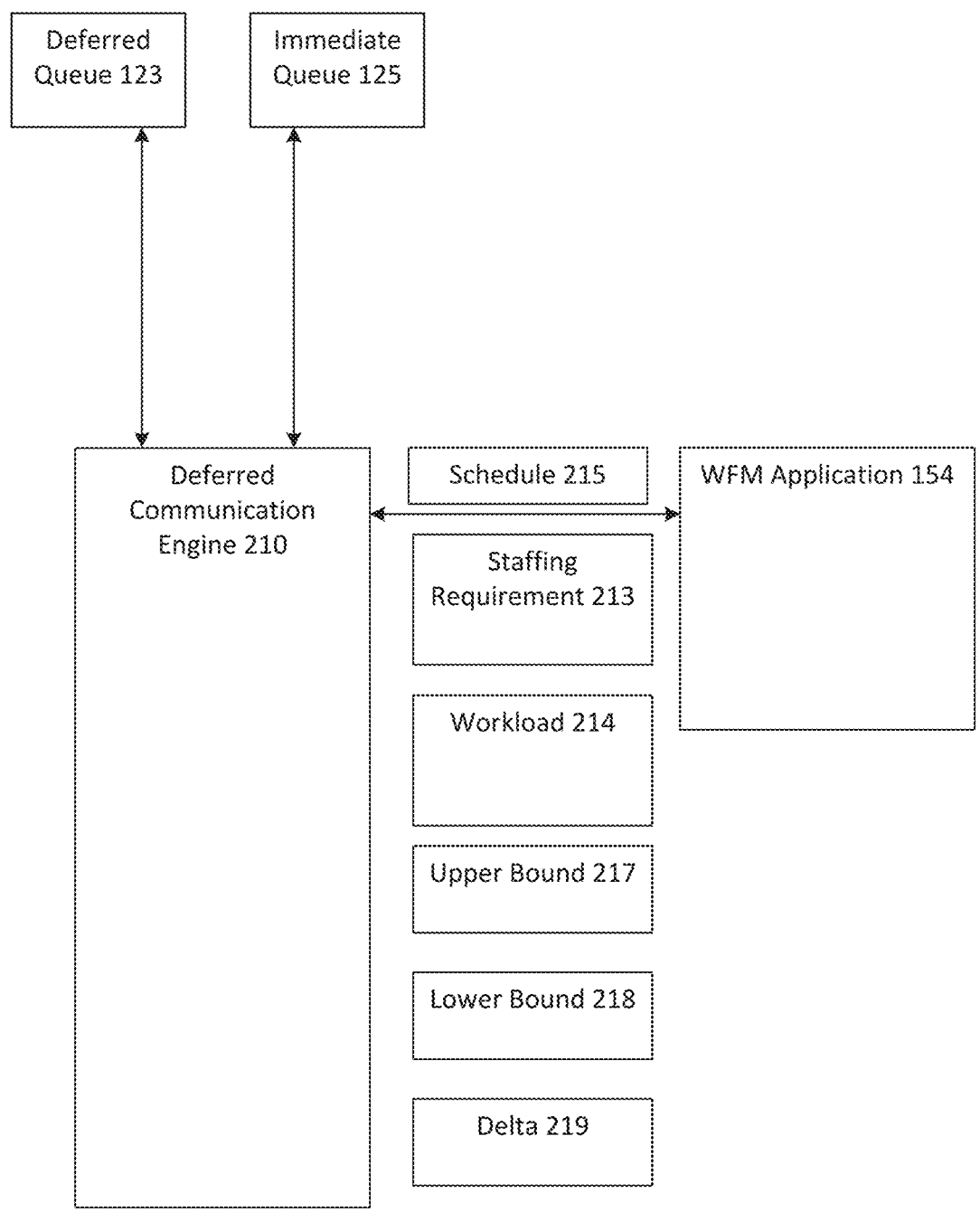
FIG. 2 is an illustration of an example system architecture for incorporating a deferred communication engine into a business or entity.

FIG. 2 is an illustration of an example system architecture for incorporating a deferred communication engine 210 into a business or entity such as a contact center 150. The deferred communication engine 210 may interact with, or may receive data from, the WFM application 154. Depending on the embodiment, each of the deferred communication engine 210 and the WFM application 154 may be implemented together or separately by one or more general purpose computing devices such as the computing system 1000 illustrated with respect to FIG. 10.

The deferred communication engine 210 may receive a staffing requirement 213 for an immediate queue 125 from the WFM application 154 for each of a plurality of intervals. The intervals of the plurality of intervals may each have the same time duration and may correspond to the smallest amount of time that can be scheduled in the contact center 150. For example, depending on the needs of the contact center 150, each interval may have a duration of fifteen minutes, thirty minutes, or one hour. Other time intervals may be used.

The intervals in the plurality of intervals may be ordered. For example, a first interval may correspond to the time period 8:00 am-8:15 am, a second interval may correspond to the time period 8:15 am-8:30 am, and a third interval may correspond to the time period 8:30 am-8:45 am.

Each staffing requirement 213 may be a value that represents the number of agents 120 that are needed to work on the associated immediate queue 125 during the associated interval to meet a service level goal for the interval or immediate queue 125. The service level goal may include maximum wait time, abandonment rate, etc. The service level goal may be set by a user or administrator.

Each staffing requirement 213 for an immediate queue 125 may be generated by the WFM application 154 based on a forecast associated with the immediate queue 125 for the plurality of intervals. The forecast for an immediate queue 125 for a plurality of intervals may be a prediction of how busy the immediate queue 125 will be (e.g., total number of communications the immediate queue 125 will receive) for each interval of the plurality of intervals. The forecast may be generated by the WFM application 154 based on historical data about how busy the particular immediate queue 125 was in the past for the same or similar intervals. Any method for generating a forecast may be used.

The WFM application 154 may determine or receive a workload 214 for a deferred queue 123 for each interval of the plurality of intervals. As used herein the workload 214 for a deferred queue 123 may be the amount of work that is expected to be received during the associated interval. In one embodiment, the WFM application 154 may determine the workload 214 for the interval by multiplying the interaction volume offered ("IVO") by the average handling time ("AHT") for the deferred queue 123 for the interval. The IVO and AHT may be part of the forecast.

In some embodiments, the WFM application 154 may normalize the workloads 214 for a deferred queue 123 such that one workload 214 roughly corresponds to an amount of work that a single agent 120 may handle during a single interval.

For example, if the IVO is ten calls and the AHT is 100 seconds, then the interval may be 1000 second of workload 214. The WFM application 154 may then normalize the workload 214 by dividing the number of workload 214 by the number of seconds in the interval. For example, if this is a 15-minute interval, then there is 1000/900=1.11 units of workload 214 in this interval.

Figure 3A:
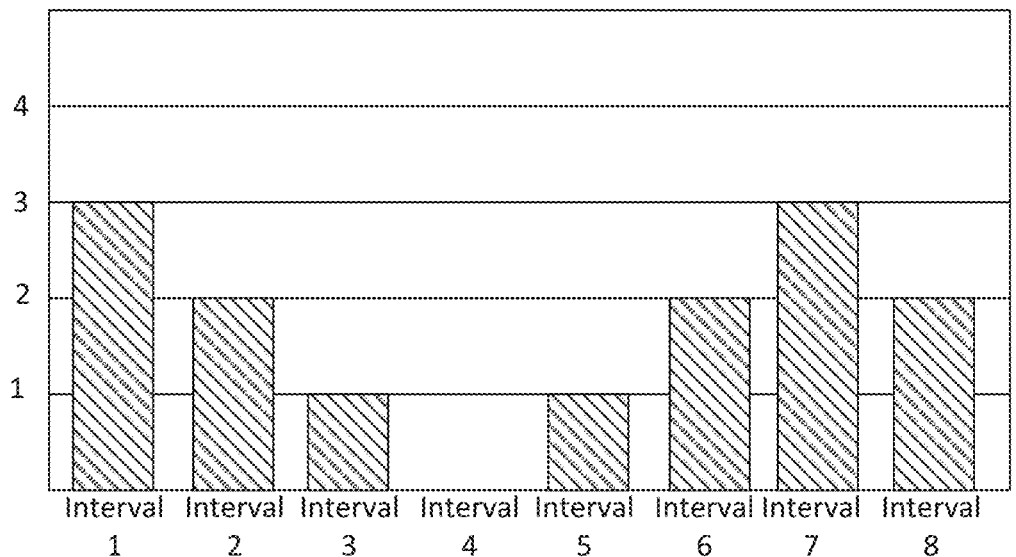
FIG. 3A is an illustration of an example set of staffing requirements.

Referring to FIG. 3A is shown an example set of staffing requirements 305 for an immediate queue 125 for a hypothetical set of intervals. As shown, the set of staffing requirements 305 covers eight intervals and each interval is associated with a staffing requirement 213. The staffing requirement 213 for the first interval has a value of 3, the staffing requirement 213 for the second interval has a value of 2, the staffing requirement 213 for the third interval has a value of 1, the staffing requirement 213 for the fourth interval has a value of 0, the staffing requirement 213 for the fifth interval has a value of 1, the staffing requirement 213 for the sixth interval has a value of 2, the staffing requirement 213 for the seventh interval has a value of 3, and the staffing requirement 213 for the eighth interval has a value of 2.

Figure 3B:
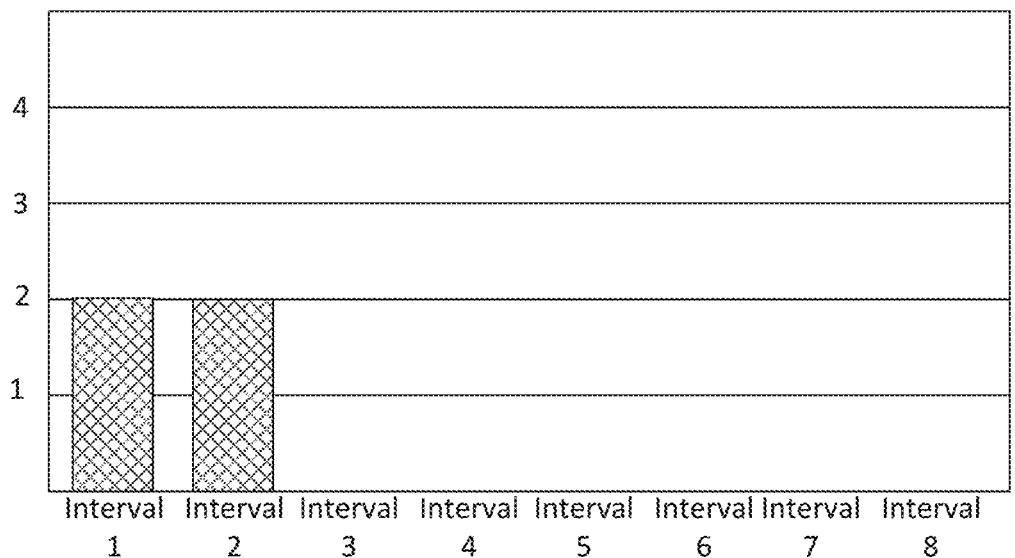
FIG. 3B is an illustration of an example set of staffing requirements.

Referring to FIG. 3B is shown an example set of staffing requirements 310 for a deferred queue 123 for the same intervals as shown in FIG. 3A. The set of staffing requirements 310 may have been generated based on received workloads 214. The staffing requirement 213 for the first interval has a value of 2 and the staffing requirement 213 for the second interval also has a value of 2. The staffing requirement 213 for the remaining intervals is 0.

The amount of time that a communication should be handled by is referred to herein as a goal time. Typically, immediate communications have a relatively short goal time (e.g., less than 30 minutes), while deferred communications have relatively longer goal time (e.g., greater than 30 minutes). The particular goal time for a communication may vary by type of communication. Example goal times include 30 minutes, one hour, two hours, or even one day. Depending on the embodiment, a deferred communication may be considered handled when an agent 120 generates and sends a response to the communication, while an immediate communication may be considered handled when the client or agent 120 hangs up or otherwise terminates the communication.

Looking again at FIG. 3B, assume that each interval represents 15 minutes and the goal time for communications in the deferred queue 123 is one hour. Accordingly, communications associated with the first interval must be completed by the fifth interval to be within the goal time, while communications associated with the second interval must be completed by the sixth interval to be within the goal time.

The deferred communication engine 210 may be configured to adjust or modify the staffing requirement 213 of a deferred queue 123 in view of the staffing requirement 213 of an immediate queue 125 and the goal time. The deferred communication engine 210 may adjust the staffing requirements 213 of the deferred queue 123 to take advantage of low or less busy intervals of the corresponding immediate queue 125. In particular, the deferred communication engine 210 may modify the staffing requirements 213 of the deferred queue 123 such that the sums of the staffing requirements 213 for the same intervals fluctuate as little as possible.

Figure 4A:
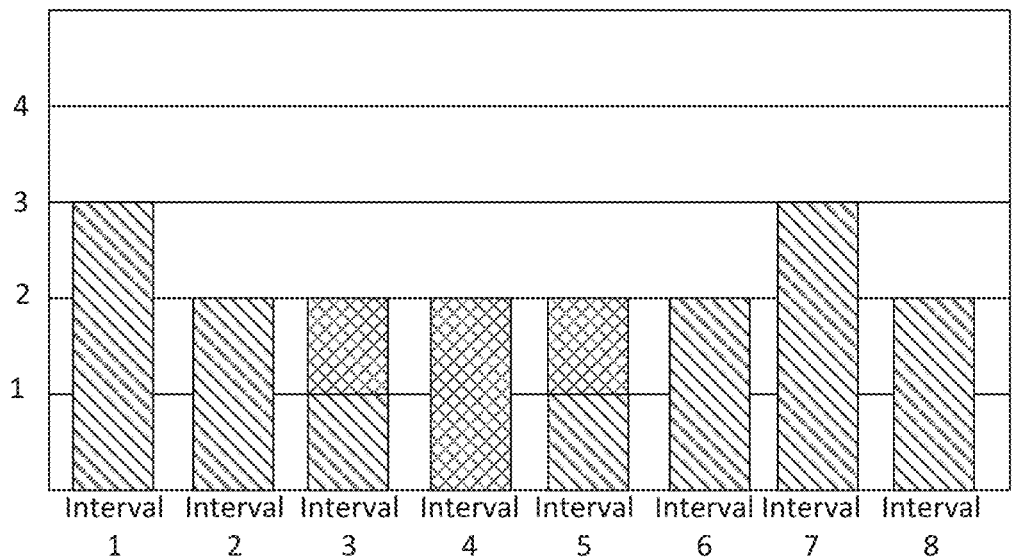
FIG. 4A is an illustration of an example combined staffing requirement.

For example, FIG. 4A is an illustration of a combined staffing requirement 405 that shows how the deferred communication engine 210 could modify the staffing requirements 213 of the deferred queue 123 in view of the staffing requirements 213 of the immediate queue 125. As shown, the staffing requirement 213 from the first interval of the deferred queue 123 has been moved into the third and fourth intervals because the fourth interval is the last interval within the goal time of the first interval. The staffing requirement 213 from the second interval of the deferred queue 123 have been moved into the fourth and fifth intervals because the fifth interval is the last interval within the goal time of the second interval.

Figure 4B:
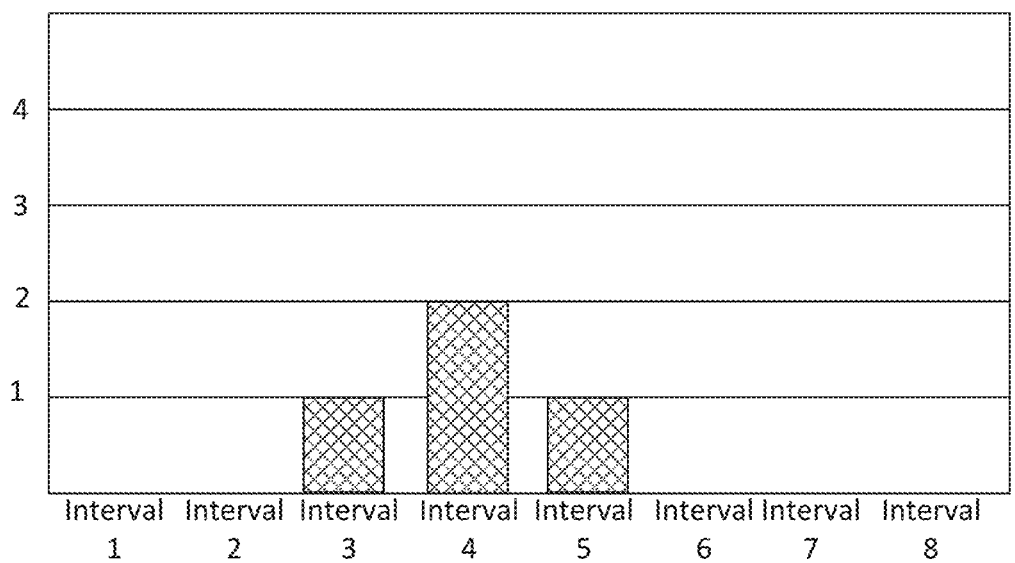
FIG. 4B is an illustration of an example modified staffing requirement.

As can been seen in the combined staffing requirement of FIG. 4A, by rearranging the staffing requirements 213 of the deferred queue 123, the variations in the overall agent need for the deferred queue 123 and the immediate queue 125 has been greatly reduced. This may result in an overall more efficient use of agent 120 resources as the same agents 120 can be scheduled between the deferred queue 123 and the immediate queue 125 as the needs of the immediate queue 125 change for each interval. FIG. 4B shows the modified staffing requirements 213 generated for the deferred queue 123. The deferred queue algorithm used by the deferred communication engine 210 to redistribute the staffing requirements 213 associated with a deferred queue 123 is described further below.

Depending on the embodiment, the deferred communication engine 210 may reconfigure the staffing requirements 213 of a deferred queue 123 in view of a set of staffing requirements 213 for an immediate queue 125 as follows: starting from the earliest to the latest, the deferred communication engine 210 may consider all the 15-minute intervals a in the set of staffing requirements 213. For each interval a, the deferred communication engine 210 may consider the region [a, b] containing the intervals ranging from the current interval a up to a+the goal time for the deferred queue 123. The goal for the deferred communication engine 210 is to distribute the staffing requirement 213 of the current interval a attributable to the workload 214 among the intervals within the region [a, b], so that the sum of the staffing requirement 213 for the deferred queue 123 and the staffing requirement 213 of the immediate queue 125 for each interval is as even as possible. Depending on the embodiment, the deferred communication engine 210 may use binary search and multiple iterations to calculate a satisfactory distribution of the staffing requirements 213.

The deferred communication engine 210 may update the staffing requirements 213 after each 15-minute interval of the deferred queue 123. The sum of the staffing requirements 213 for the immediate queue 125 and the staffing requirements 213 for the deferred queue 123 calculated up to the current moment is referred to herein as the set of combined staffing requirements 213.

For each interval a, as above, the deferred communication engine 210 may consider some tentative levels from which it may pick an optimal level that is used as a reference to distribute the staffing requirement 213 from the current interval a attributable to the workload 214 among the intervals within the region [a, b]. Each optimal level approximates the lowest level at which the staffing requirement 213 from the current interval attributable to the workload 214 can be distributed. The deferred communication engine 210 at each iteration of the algorithm may determine an upper bound 217 and a lower bound 218 for the optimal level. The upper bound 217 and lower bound 218 may be updated by the deferred communication engine 210 during each iteration of the algorithm, getting progressively closer to the optimal level. To do so, the deferred communication engine 210 may pick intermediate values and may analyze whether they are above or below the optimal level.

In some embodiments, using the amount of time that the contact center 150 is functioning in each 15-minute interval as weights, the initial upper bound 217 for the optimal level may be given by:

$$\text{Weighted Average}\{\text{Combined Staffing} \in [a,b]\} + WL(a)/\{\text{Time Open} \in [a,b]\}$$

The initial lower bound 218 for the optimal level may be given by:

$$\min\{\text{Combined Staffing} \in [a,b]\} + WL(a)/\{\text{Time Open} \in [a,b]\}$$

In each iteration, the deferred communication engine 210 may determine if the value $$\text{level} = \frac{\text{Upper} + \text{Lower}}{2}$$

is above or below the optimal level for the level and then the deferred communication engine 210 may update the bounds accordingly.

Continuing the example shown in FIGS. 3A and 3B, the initial value for the upper bound 217 calculated by the deferred communication engine 210 is $$2 = \frac{(3+2+1)+2}{4}$$

and the initial value for the lower bound 218 calculated by the deferred communication engine 210 is $0.5 = 2/4$. The level is $$1.25 = \frac{2 + 0.5}{2}.$$

In some embodiments, for each interval in [a, b], in the case that the combined staffing requirements 213 are smaller than the tentative level, the deferred communication engine 210 may subtract the difference between the level and the staffing requirement 213 from the staffing requirement 213 attributable to the workload 214. If the contact center 150 is not functioning the whole 15 minutes of the interval, the deferred communication engine 210 may multiply the difference by the fraction of the interval that the contact center 150 is functioning before subtracting.

If the deferred communication engine 210 has used up the whole staffing requirement 213 attributable to the workload 214 for the interval, meaning that the deferred communication engine 210 was not able to fill up the subsequent intervals up to the current level, the deferred communication engine 210 may lower the upper bound 218 and make it equal to the tentative level. If the deferred communication engine 210 uses up the whole staffing requirement 213 attributable to the workload 214 at the current level, the deferred communication engine 210 may increase the lower bound 218 and make it equal to the tentative level.

Continuing the example above, using the level 1.25, the deferred communication engine 210 may obtain a new staffing requirement 213 for the deferred queue 123 equal to (0, 0, 0.25, 1.25), so all the workload was not used. Then, the deferred communication engine 210 may update the lower bound 218 to 1.25, and may repeat the process one more time, obtaining the staffing requirement 213 of (0, 0, 0.625, 1.375). The deferred communication engine 210 may then continue to the next interval, as described below.

Once the difference between the upper bound 217 and the lower bound 218 is less than a delta 219, the deferred communication engine 210 may assign the value of the upper bound 217 as the optimal level. The deferred communication engine 210 may then distribute the staffing requirement 213 attributable to the workload 214 from the deferred queue 123 in the current 15-minute interval, through the subsequent intervals up to the goal time, and may update the combined staffing requirement 213.

Returning to the example described above, the deferred communication engine 210 may distribute the staffing requirement 213 attributable to the workload 214 from the second interval, considering that the combined staffing requirement 213 in that moment is (2, 1.625, 1.375, 1). The deferred communication engine 210 may calculate the value of the upper bound 217 as $$2 = \frac{(2 + 1.625 + 1.375 + 1) + 2}{4}$$

and the value of the lower bound 218 as $1.5 = 1 + 2/4$. Because the deferred communication engine 210 cannot use up all the staffing requirement 213 attributable to the workload 214 in the interval when the level is 1.75, 2 may be used as the optimal level. The deferred communication engine 210 may generate the final set of staffing requirements 213 for the deferred queue 123 as (0, 0, 1, 2, 1, 0, 0, 0).

The final set of staffing requirements 213 for the deferred queue 123 may be obtained by the deferred communication engine 210 subtracting the set of staffing requirements 213 of the immediate queue from the set of combined staffing requirements 213.

Note that after generating the set of combined staffing requirements 213, the deferred communication engine 210 may further consider additional deferred queues 123 for the intervals. The deferred communication engine 210 may use the set of combined staffing requirements 213 in place of the set of staffing requirements 213 for the immediate queue 125 in the above described algorithm and may generate a new set of combined staffing requirements 213 that is based on both of the deferred queues 123 and the original immediate queue 125. In this way the deferred communication engine 210 may generate a set of combined staffing requirements 213 for an immediate queue 125 and arbitrary numbers of deferred queues 123.

Figure 5:
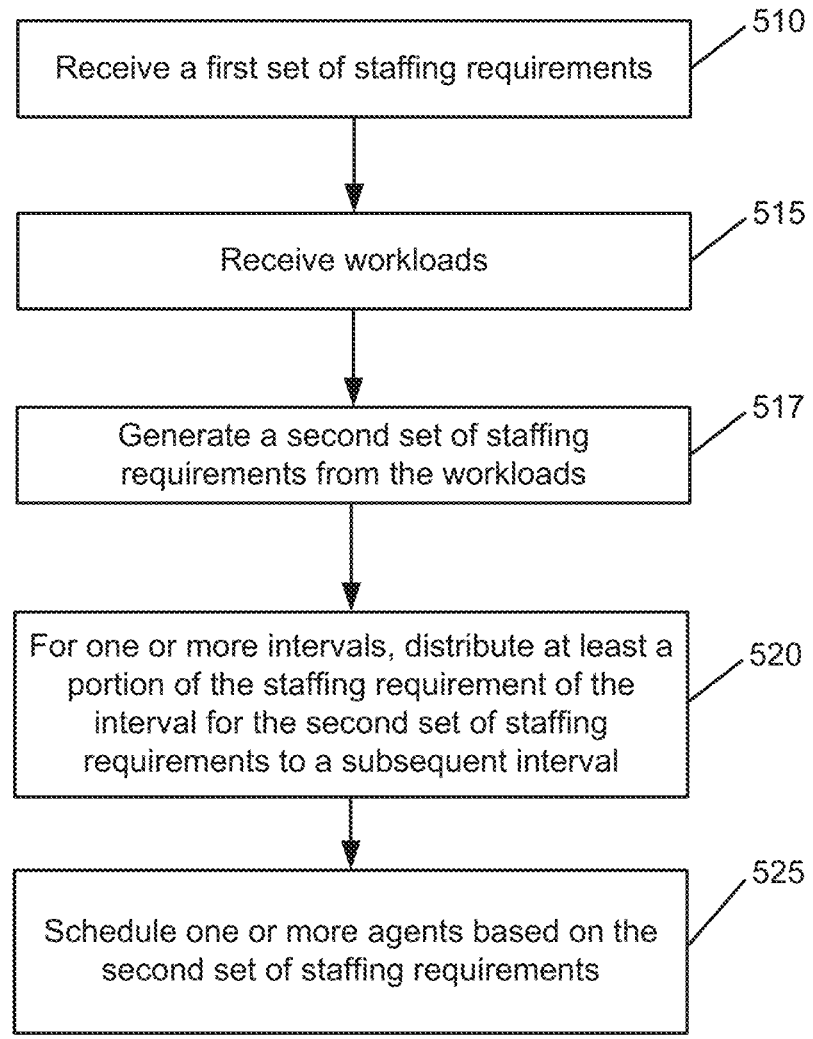
FIG. 5 is an illustration of an example method for determining a set of optimal staffing requirement for a deferred queue in view of an immediate queue and for scheduling agents based on the optimal staffing requirements.

FIG. 5 is an illustration of an example method 500 for determining an optimal staffing requirement for a deferred queue in view of an immediate queue and for scheduling agents based on the optimal staffing requirement. The method 500 may be implemented by the deferred communication engine 210 of the contact center 150.

At 510, a first set of staffing requirements is received. The first set of staffing requirements 213 may be received by the deferred communication engine 210 from the WFM application 154. The first set of staffing requirements 213 may be for an immediate queue 125. The set of staffing requirements 213 may be associated with a plurality of intervals. The staffing requirement 213 for an interval may be the number of agents 120 that are needed to work on the immediate queue 125 to achieve a desired service level goal for the interval. The first set of staffing requirements 213 may have been generated by the WFM application 154 based on a forecast of how busy the immediate queue 125 is likely to be for the intervals of the plurality of intervals.

At 515, workloads are received. The workloads 214 may be received by the deferred communication engine 210 from the WFM application 154. The workloads 214 may be for a deferred queue 123. The workloads 214 may be associated with the same plurality of intervals as the first set of staffing requirements 213. Each workload 214 may be calculated using a forecast for the deferred queue 123. The workloads 214 may be normalized, for example.

At 517, a second set of staffing requirements is generated. The second set of staffing requirements 213 may be generated by the deferred communication engine 210 based on the workloads 214.

At 520, for one or more intervals, at least a portion of the staffing requirement of the second set of staffing requirements for the interval is distributed to a subsequent interval. The portion of the staffing requirement 213 may be distributed by the deferred communication engine 210 to a next or subsequent interval within the goal time associated with the deferred queue 123. As described above, communications in the deferred queue 123 have to be handled by their associated goal time.

Depending on the embodiment, some or all of the portions of the staffing requirement 213 attributable to the workload 214 may be distributed to other intervals such that the combined staffing requirements 213 from the first set of staffing requirements 213 and the second set of staffing requirements 213 for each interval is evened out. Put another way, the deferred communication may redistribute the staffing requirements 213 of the intervals in a way that minimizes the differences between the sums of the staffing requirement 213 from the first set of staffing requirements 213 and the staffing requirement from the second set of staffing requirement 213 for each interval.

At 525, one or more agents are scheduled. The one or more agents 120 may be scheduled by the WFM application 154 according to the second set of staffing requirements 213.

Figure 6:
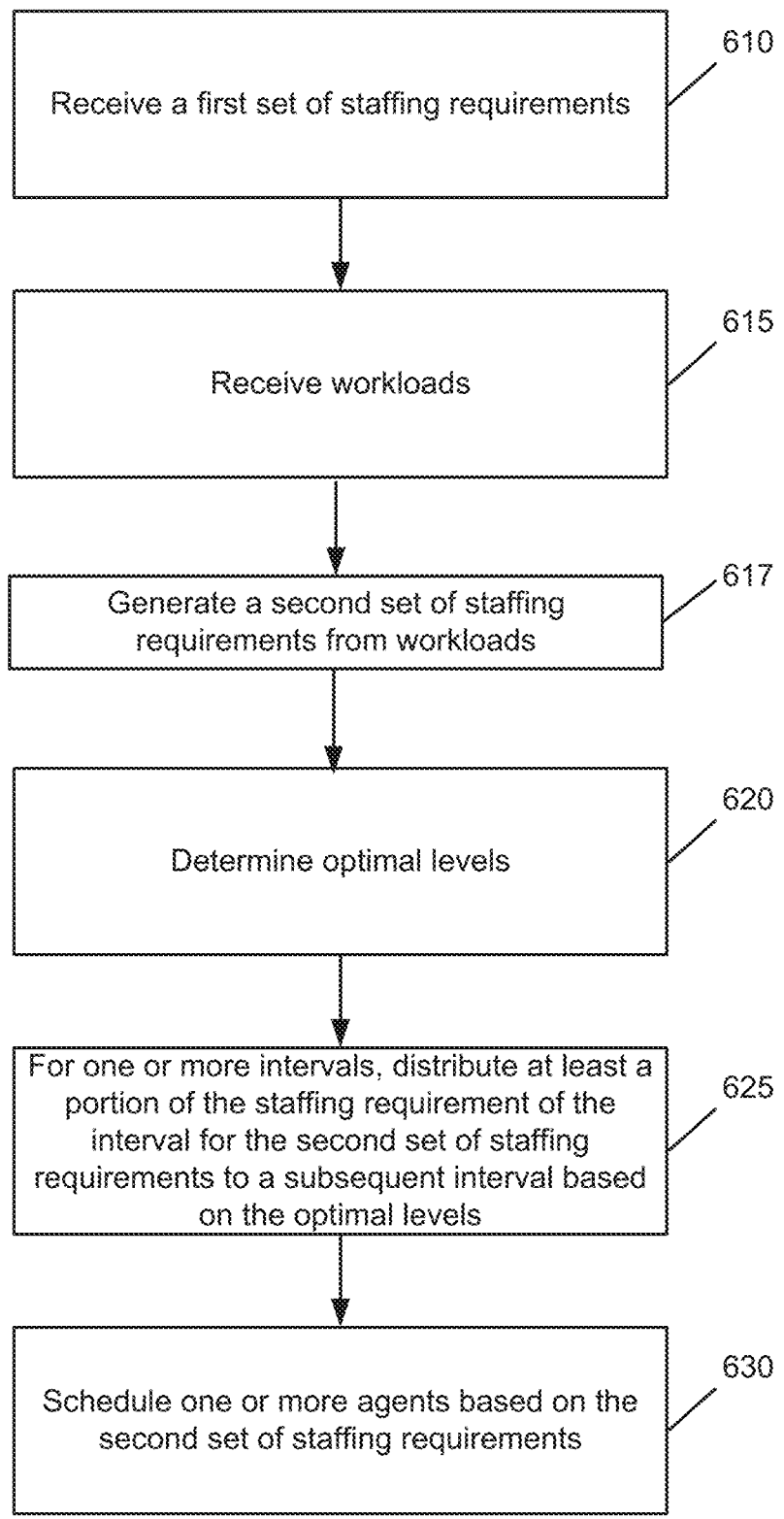
FIG. 6 is an illustration of an example method for determining an optimal set of staffing requirements for a deferred queue in view of an immediate queue and for scheduling agents based on the optimal staffing requirements.

FIG. 6 is an illustration of an example method 600 for determining an optimal staffing requirement for a deferred queue in view of an immediate queue and for scheduling agents based on the optimal staffing requirement. The method 600 may be implemented by the deferred communication engine 210 of the contact center 150.

At 610, a first set of staffing requirements is received. The first set of staffing requirements 213 may be received by the deferred communication engine 210 from the WFM application 154. The first set of staffing requirements 213 may be for an immediate queue 125. The first set of staffing requirements 213 may be associated with a plurality of intervals. The staffing requirement 213 for an interval may be the number of agents 120 that are needed to work on the immediate queue 125 to achieve a desired service level goal for the interval.

At 615, workloads are received. The workloads 214 may be received by the deferred communication engine 210 from the WFM application 154. The workloads 214 may be for a deferred queue 123. The workloads 214 may be associated with the same plurality of intervals as the set of staffing requirements 213. Each workload 214 may be calculated using a forecast for the deferred queue 123. The workloads 214 may be normalized so that they represent a number of agents 120, for example.

At 617, a second set of staffing requirements is generated. The second set of staffing requirements 213 may be generated by the deferred communication engine 210 based on the workloads 214.

At 620, an optimal level is determined. Each optimal level may be determined by the deferred communication engine 210. The optimal level may be the level that staffing requirements of the second set of staffing requirements 213 of the deferred queue 123 may be redistributed to smooth or even out the sums of the staffing requirements 213 for each interval.

At 625, for one or more intervals, at least a portion of the staffing requirement of the second set of staffing requirements for the interval is distributed to a subsequent interval based on the optimal levels. The portions may be distributed until, for as many intervals as possible, a sum of the staffing requirements 213 for the interval is at or below the optimal levels.

Depending on the embodiment, each optimal level may be determined by the deferred communication engine 210 adjusting an upper bound 217 and a lower bound 218 based on the workloads 214 and the staffing requirements 213 until the upper bound 217 and the lower bound 218 are within a delta 219. The upper bound 217 may then be used as the optimal level.

At 630, one or more agents are scheduled. The one or more agents 120 may be scheduled by the WFM application 154 according to the second set of staffing requirements 213.

Figure 7:
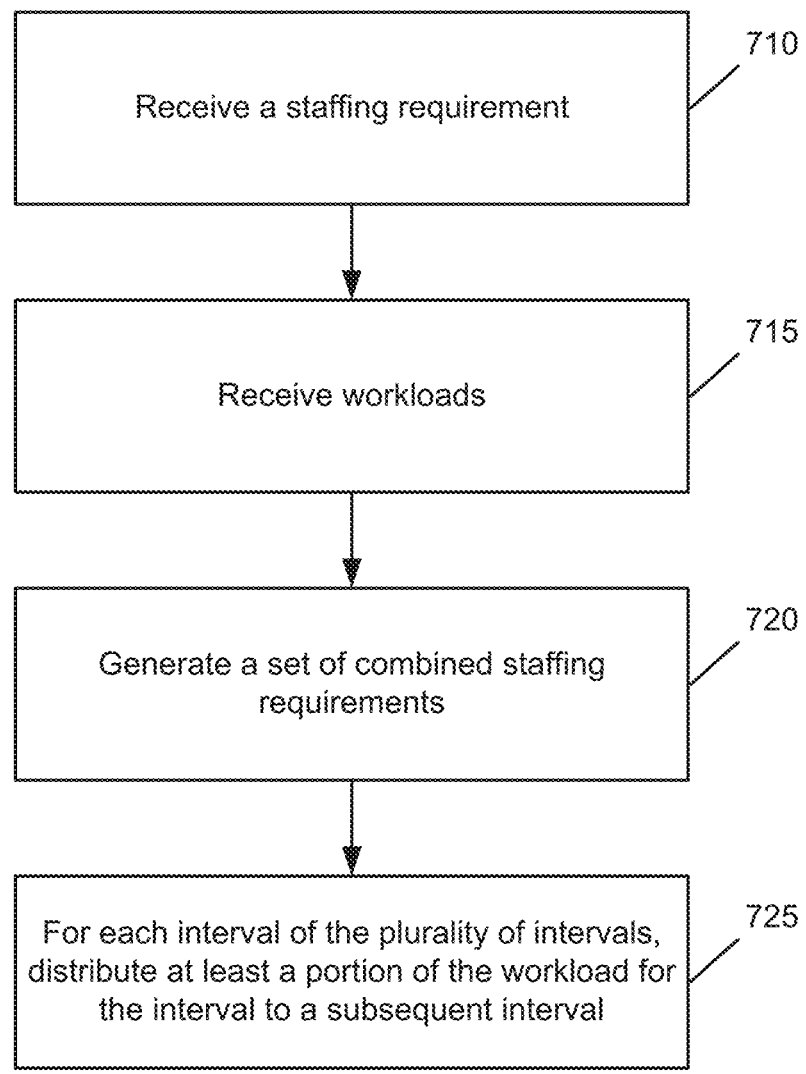
FIG. 7 is an illustration of an example method for generating a set of combined staffing requirements for a deferred queue and an immediate queue.

FIG. 7 is an illustration of an example method 700 for generating a combined staffing requirement for a deferred and an immediate queue. The method 700 may be implemented by the deferred communication engine 210 of the contact center 150.

At 710, a set of staffing requirements is received. The set of staffing requirements 213 may be received by the deferred communication engine 210 from the WFM application 154. The set of staffing requirements 213 may be for an immediate queue 125. The set of staffing requirements 213 may be associated with a plurality of intervals. The staffing requirement 213 for an interval may be the number of agents 120 that are needed to work on the immediate queue 125 to achieve a desired service level goal for the interval.

At 715, workloads are received. The workloads 214 may be received by the deferred communication engine 210 from the WFM application 154. The workloads 214 may be for a deferred queue 123. The workloads 214 may be associated with the same plurality of intervals as the set of staffing requirements 213. Each workload 214 may be calculated using a forecast for the deferred queue 123. The workloads 214 may be normalized so that they represent a number of agents 120, for example.

At 720, a set of combined staffing requirements is generated. The set of combined staffing requirements may be generated by the deferred communication engine 210 by, for each interval of the plurality of intervals, generating a combined staffing requirement 213 using the staffing requirement 213 and the workload 214 for the interval.

At 725, the combined staffing requirements 213 for some of the intervals are redistributed to other subsequent intervals. The combined staffing requirements may be redistributed by the deferred communication engine 210 by, for each interval of the plurality of intervals, when the combined staffing requirement 213 is above an optimal level, distributing at least a portion of the combined staffing requirement 213 attributable to the workloads 214 of the deferred queue 123 from the interval to the combined staffing requirement 213 of a subsequent interval.

Figure 8:
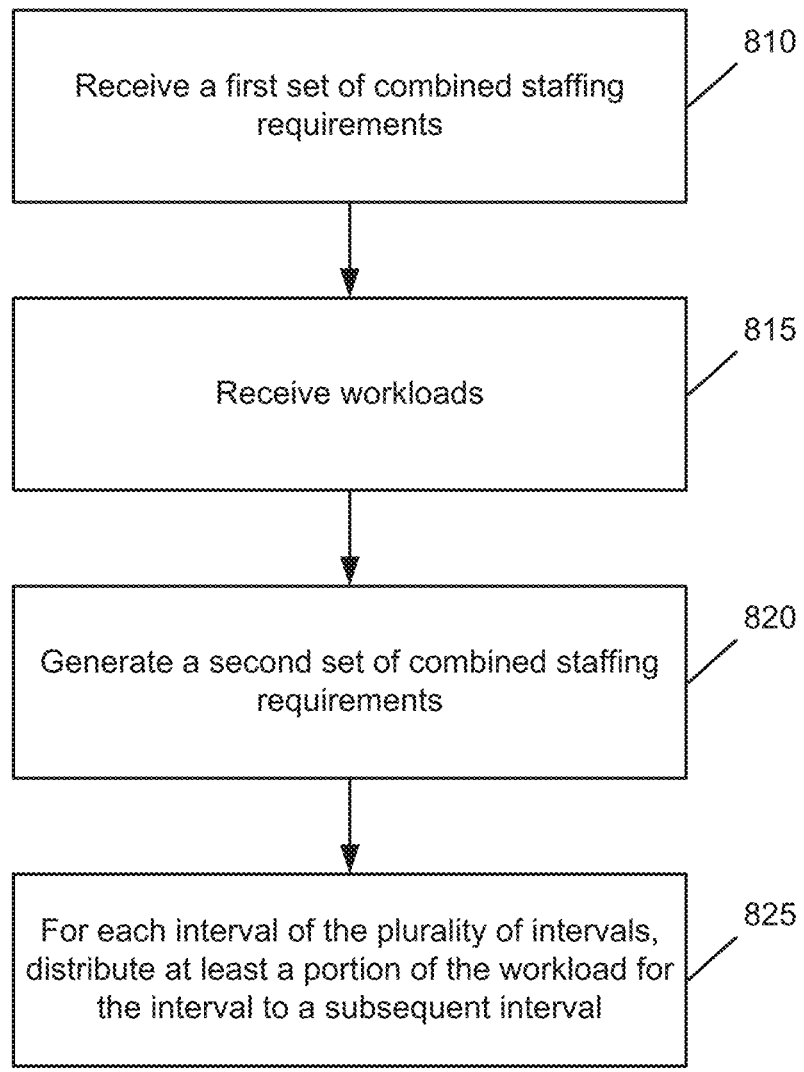
FIG. 8 is an illustration of an example method for generating a set of combined staffing requirements for an immediate queue and a plurality of deferred queues.

FIG. 8 is an illustration of an example method 800 for generating a set of combined staffing requirements for an immediate queue and a plurality of deferred queues. The method 800 may be implemented by the deferred communication engine 210 of the contact center 150.

At 810, a first set of combined staffing requirements is received. The first set of combined staffing requirements 213 may be received by the deferred communication engine 210. The first set of combined staffing requirements 213 may be for an immediate queue 125 and a deferred queue 123. The first set of combined staffing requirements 213 may be associated with a plurality of intervals and may include a combined staffing requirement 213 for each interval.

At 815, workloads are received. The workloads 214 may be received by the deferred communication engine 210 from the WFM application 154. The workloads 214 may be for a deferred queue 123. The workloads 214 may be associated with the same plurality of intervals as the first set of combined staffing requirements 213.

At 820, a second set of combined staffing requirements is generated. The second set of combined staffing requirement 213 may be generated by the deferred communication engine 210 by, for each interval of the plurality of intervals, generating a new combined staffing requirement 213 using the staffing requirement 213 generated from the workload 214 for the interval and the combined staffing requirement 213 from the first set of combined staffing requirements 213 for the interval.

At 825, the combined staffing requirements for some of the intervals are redistributed to other subsequent intervals for the second set of combined staffing requirements 213. The combined staffing requirements 213 may be redistributed by the deferred communication engine 210 by, for each interval of the plurality of intervals, when the combined staffing requirement 213 is above an optimal level, distributing at least a portion of the combined staffing requirement 213 attributable to the workload 214 of the deferred queue 123 from the interval to the combined staffing requirement 213 of a subsequent interval.

Figure 9:
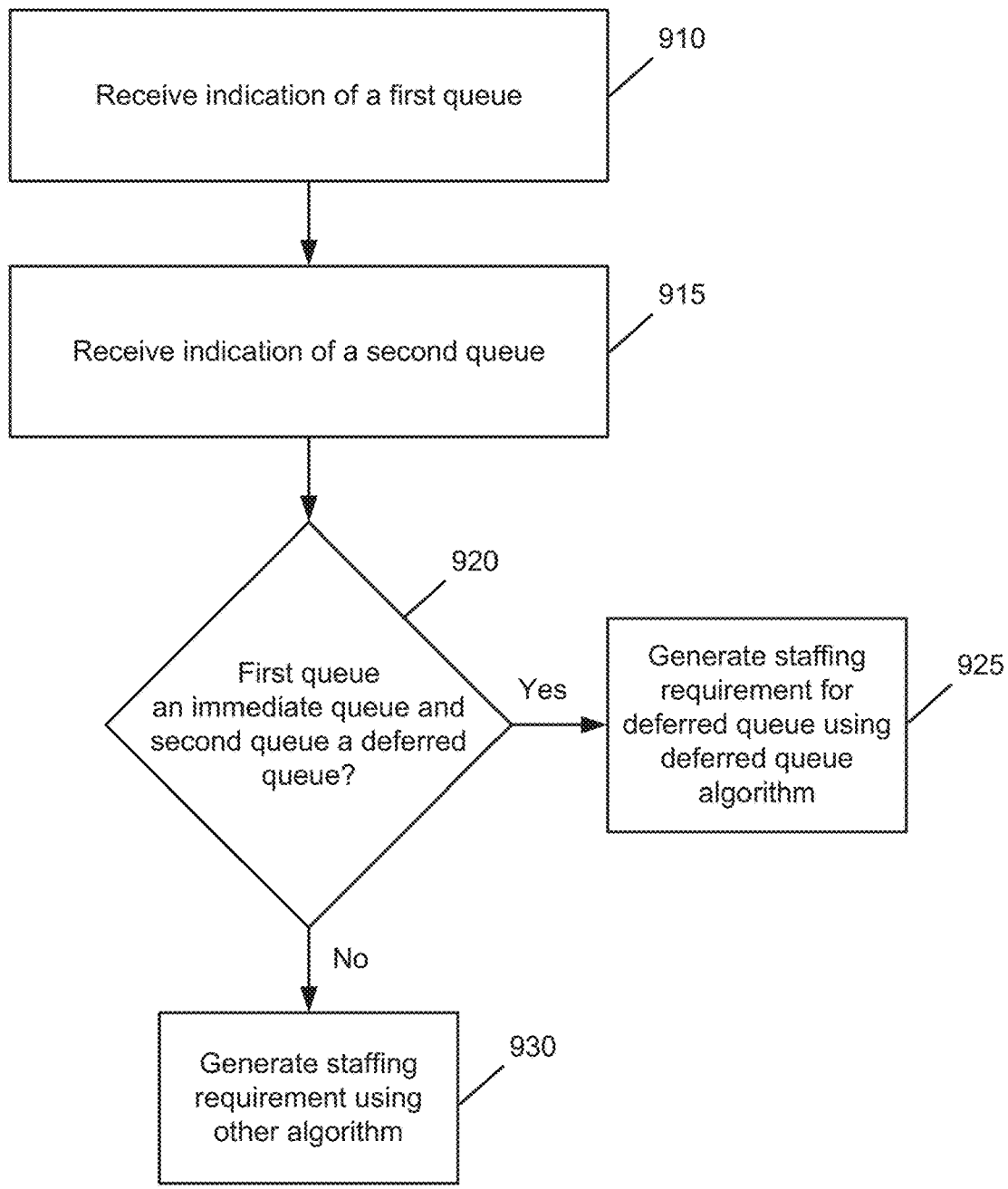
FIG. 9 is an illustration of an example method for determining whether or not to generate a staffing requirement for a queue using the deferred queue algorithm.

FIG. 9 is an illustration of an example method 900 for determining whether or not to generate a staffing requirement for a queue using the deferred queue algorithm. The method 900 may be implemented by the deferred communication engine 210 of the contact center 150.

At 910, an indication of a first queue is received. The indication of the first queue may be received by the deferred communication engine 210. The first queue may be associated with a first goal time that is the length of time that communications associated with the first queue should be handled.

At 915, an indication of a second queue is received. The indication of the second queue may be received by the deferred communication engine 210. The second queue may be associated with a second goal time that is the length of time that communications associated with the second queue should be handled.

At 920, whether the first queue is an immediate queue and the second queue is a deferred queue is determined. The determination may be made by the deferred communication engine 210 using the first goal time, the second goal time and a threshold goal time. If the first goal time is below the threshold goal time, then the first queue is an immediate queue. If the second goal time is above the threshold goal time, then the second queue is a deferred queue. The threshold goal time may be set by an administrator. An example threshold goal time is 30 minutes.

If the first queue is an immediate queue and the second queue is a deferred queue then the method 900 may continue to 925 where a staffing requirement for the deferred queue may be generated using the deferred queue algorithm described herein. Else, the method 900 may continue at 930 where another algorithm may be used.

Figure 10:
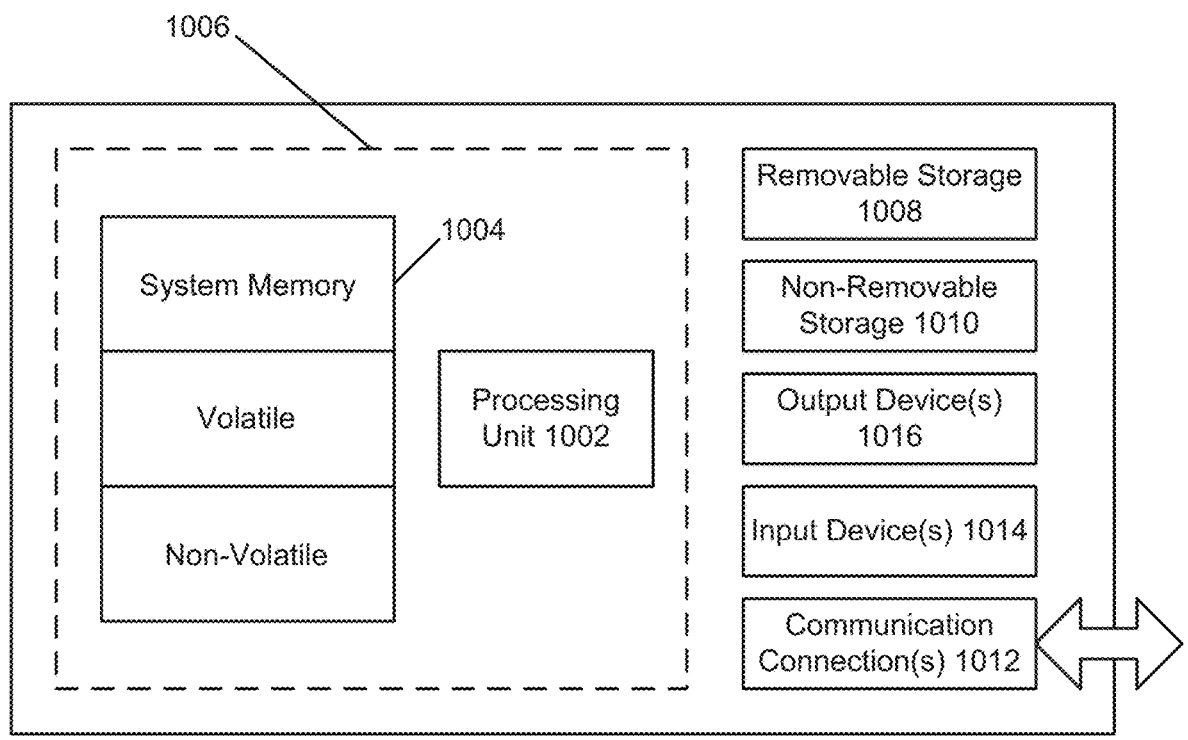
FIG. 10 illustrates an example computing device.

FIG. 10 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of tangible computer readable media. Computer readable media can be any available tangible media that can be accessed by device 1000 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communications connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

Returning to FIG. 1, agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself may be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides realtime status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for managing deferred communications in a call center, the method comprising:
   receiving a first set of staffing requirements for a first queue by a computing device, wherein the first set of staffing requirements includes a staffing requirement for each interval of a plurality of intervals, and the intervals of the plurality of intervals are ordered and wherein the first queue is an immediate queue associated with immediate communications;
   receiving a workload for each interval of the plurality of intervals for a second queue by the computing device, wherein the second queue is a deferred queue associated with deferred communications;
   generating a second set of staffing requirements for the second queue by the computing device based on the received workload for each interval;
   determining an optimal level of staffing based on the first set of staffing requirements and the second set of staffing requirements by the computing device; and
   for each interval of the plurality of intervals, when a sum of a staffing requirement of the first set of staffing requirements for the interval and a staffing requirement of the second set of staffing requirements for the interval is above the optimal level, distributing at least a portion of the staffing requirement of the second set of staffing requirements associated with the interval to a staffing requirement of the second set of staffing requirements associated with a subsequent interval in a manner such that the total number of agents scheduled for each interval across the first queue and the second queue remains relatively constant.

2. The method of claim 1, wherein the workloads are associated with a goal time and each interval of the plurality of intervals is associated with a duration of time, and distributing at least a portion of the staffing requirement of the second set of staffing requirements associated with the interval to a staffing requirement of the second set of staffing requirements of a subsequent interval comprises:
   distributing at least a portion of the staffing requirement of the second set of staffing requirements associated with the interval to a staffing requirement of the second set of staffing requirements of a subsequent interval that is within the goal time measured from the interval to the subsequent interval based on the duration of time associated with each interval.

3. The method of claim 2, wherein the goal time is based on a type of a deferred communication associated with the second queue.

4. The method of claim 3, wherein the type comprises one or more of e-mail, SMS, or twitter.

5. The method of claim 1, wherein the first and second queues are associated with a contact center.

6. The method of claim 1, further comprising generating a schedule based on the second set of staffing requirements.

7. The method of claim 1, wherein determining an optimal level comprises determining an optimal level of staffing for each interval.

8. The method of claim 1, wherein determining an optimal level comprises determining an upper bound and a lower bound and determining the optimal level based on the determined upper bound and the determined lower bound.

9. The method of claim 1, further comprising determining that the first queue is an immediate queue and determining that the second queue is a deferred queue by receiving a first goal time for the first queue, receiving a second goal time for the second queue, and determining that the first queue is an immediate queue and the second queue is a deferred queue based on the first and second goal times.

10. The method of claim 9, wherein determining that the first queue is an immediate queue comprises determining that the first goal time is below a threshold goal time.

11. The method of claim 9, wherein determining that the second queue is a deferred queue comprises determining that the second goal time is above a threshold goal time.

12. The method of claim 9, wherein the second goal time is based on a type of a deferred communication associated with the second queue.

13. A system for managing deferred communications in a call center, the system comprising:
at least one processor; and
a non-transitory computer readable medium comprising instructions that, when executed by the at least one processor, cause the system to:
receive a first set of staffing requirements for a first queue, wherein the first set of staffing requirements includes a staffing requirement for each interval of a plurality of intervals, and the intervals of the plurality of intervals are ordered and wherein the first queue is an immediate queue associated with immediate communications;
receive a workload for each interval of the plurality of intervals for a second queue, wherein the second queue is a deferred queue associated with deferred communications;
generate a second set of staffing requirements for the second queue based on the received workload for each interval;
determine an optimal level of staffing based on the first set of staffing requirements and the second set of staffing requirements; and
for each interval of the plurality of intervals, when a sum of a staffing requirement of the first set of staffing requirements for the interval and a staffing requirement of the second set of staffing requirements for the interval is above the optimal level, distribute at least a portion of the staffing requirement of the second set of staffing requirements associated with the interval to a staffing requirement of the second set of staffing requirements associated with a subsequent interval in a manner such that the total number of agents scheduled for each interval across the first queue and the second queue remains relatively constant.

14. The system of claim 13, wherein the workloads are associated with a goal time and
each interval of the plurality of intervals is associated with a duration of time, and distributing at least a portion of the staffing requirement of the second set of staffing requirements associated with the interval to a staffing requirement of the second set of staffing requirements of a subsequent interval comprises:
distributing at least a portion of the staffing requirement of the second set of staffing requirements associated with the interval to a staffing requirement of the second set of staffing requirements of a subsequent interval that is within the goal time measured from the interval to the subsequent interval based on the duration of time associated with each interval.

15. The system of claim 14, wherein the goal time is based on a type of a deferred communication associated with the second queue.

16. The system of claim 15, wherein the type comprises one or more of e-mail, SMS, or twitter.

17. The system of claim 13, wherein the first and second queues are associated with a contact center.

18. The system of claim 13, further comprising instructions that, when executed by the at least one processor, cause the system to generate a schedule based on the second set of staffing requirements.

19. The system of claim 13, wherein determining an optimal level comprises determining an optimal level of staffing for each interval.

20. The system of claim 13, wherein determining an optimal level comprises determining an upper bound and a lower bound and determining the optimal level based on the determined upper bound and the determined lower bound.

21. The system of claim 13, wherein the instructions, when executed by the at least one processor, further cause the system to determine that the first queue is an immediate queue and determine that the second queue is a deferred queue by receiving a first goal time for the first queue, receiving a second goal time for the second queue, and determining that the first queue is an immediate queue and the second queue is a deferred queue based on the first and second goal times.

22. The system of claim 21, wherein determining that the first queue is an immediate queue comprises determining that the first goal time is below a threshold goal time.

23. The system of claim 21, wherein determining that the second queue is a deferred queue comprises determining that the second goal time is above a threshold goal time.

24. The system of claim 21, wherein the second goal time is based on a type of a deferred communication associated with the second queue.

25. A non-transitory computer readable medium comprising instructions that, when
executed by the at least one processor, cause the at least one processor to:
receive a first set of staffing requirements for a first queue, wherein the first set of staffing requirements includes a staffing requirement for each interval of a plurality of intervals, and the intervals of the plurality of intervals are ordered and wherein the first queue is an immediate queue associated with immediate communications;
receive a workload for each interval of the plurality of intervals for a second queue, wherein the second queue is a deferred queue associated with deferred communications;
generate a second set of staffing requirements for the second queue based on the received workload for each interval;
determine an optimal level based of staffing on the first set of staffing requirements and the
second set of staffing requirements; and
for each interval of the plurality of intervals, when a sum of the staffing requirement of the first set of staffing requirements for the interval and a staffing requirement of the second set of staffing requirements for the interval is above the optimal level, distribute at least a portion of the staffing requirement of the second set of staffing requirements associated with the interval to a staffing requirement of the second set of staffing requirements associated with a subsequent interval in a manner such that the total number of agents scheduled for each interval across the first queue and the second queue remains relatively constant.

26. The computer readable medium of claim 25, wherein the second queue is a deferred queue associated with deferred communications and the first queue is an immediate queue associated with immediate communications.

* * * * *